United States Patent [19]

Welch

[11] 4,008,743
[45] Feb. 22, 1977

[54] PNEUMATIC TIRE WITH PUNCTURE RESISTANCE INTERNAL SAFETY STRUCTURE

[75] Inventor: John Alan Welch, Cuyahoga Falls, Ohio

[73] Assignee: The General Tire & Rubber Company, Akron, Ohio

[22] Filed: Aug. 27, 1975

[21] Appl. No.: 608,134

[52] U.S. Cl. .................. 152/158; 152/330 RF; 152/340; 152/400; 152/311

[51] Int. Cl.² ............... B60C 17/02; B60C 17/04; B60C 5/08

[58] Field of Search .......... 152/158, 339, 340, 331, 152/399, 400, 329, 311–314, 330 L, 330 RF

[56] References Cited

UNITED STATES PATENTS

| 888,345 | 5/1908 | Musclow et al. | 152/158 |
|---|---|---|---|
| 1,488,998 | 4/1924 | Marshall | 152/158 |
| 2,045,341 | 6/1936 | Bourdon | 152/158 |
| 2,237,245 | 4/1941 | Wilson et al. | 152/313 |
| 2,560,609 | 7/1951 | Van Hulzen | 152/339 |
| 3,025,902 | 3/1962 | Sanderson | 152/340 |
| 3,195,601 | 7/1965 | Travers | 152/313 |
| 3,724,521 | 4/1973 | Coddington et al. | 152/340 |
| 3,945,419 | 3/1976 | Kosanke | 152/330 RF |

*Primary Examiner*—Drayton E. Hoffman

[57] ABSTRACT

A pneumatic tire with an internal toroidal safety structure that expands and provides emergency support between the tire tread and the wheel rim if the tire loses inflation pressure. The safety structure has an outer circumferential belt comprising one or more superposed layers of cord reinforced strips, the belt being secured to the safety structure in a relatively narrow central circumferential zone so that radial expansion of the toroidal safety structure is readily accommodated should the tire lose inflation pressure. The belt bears between the inner surface of the tread portion of the tire and the safety structure in the event of tire deflation or underinflation and thus guards against puncture. The safety structure may be an internal inflatable tube or a flexible resilient foam member, for example.

3 Claims, 8 Drawing Figures

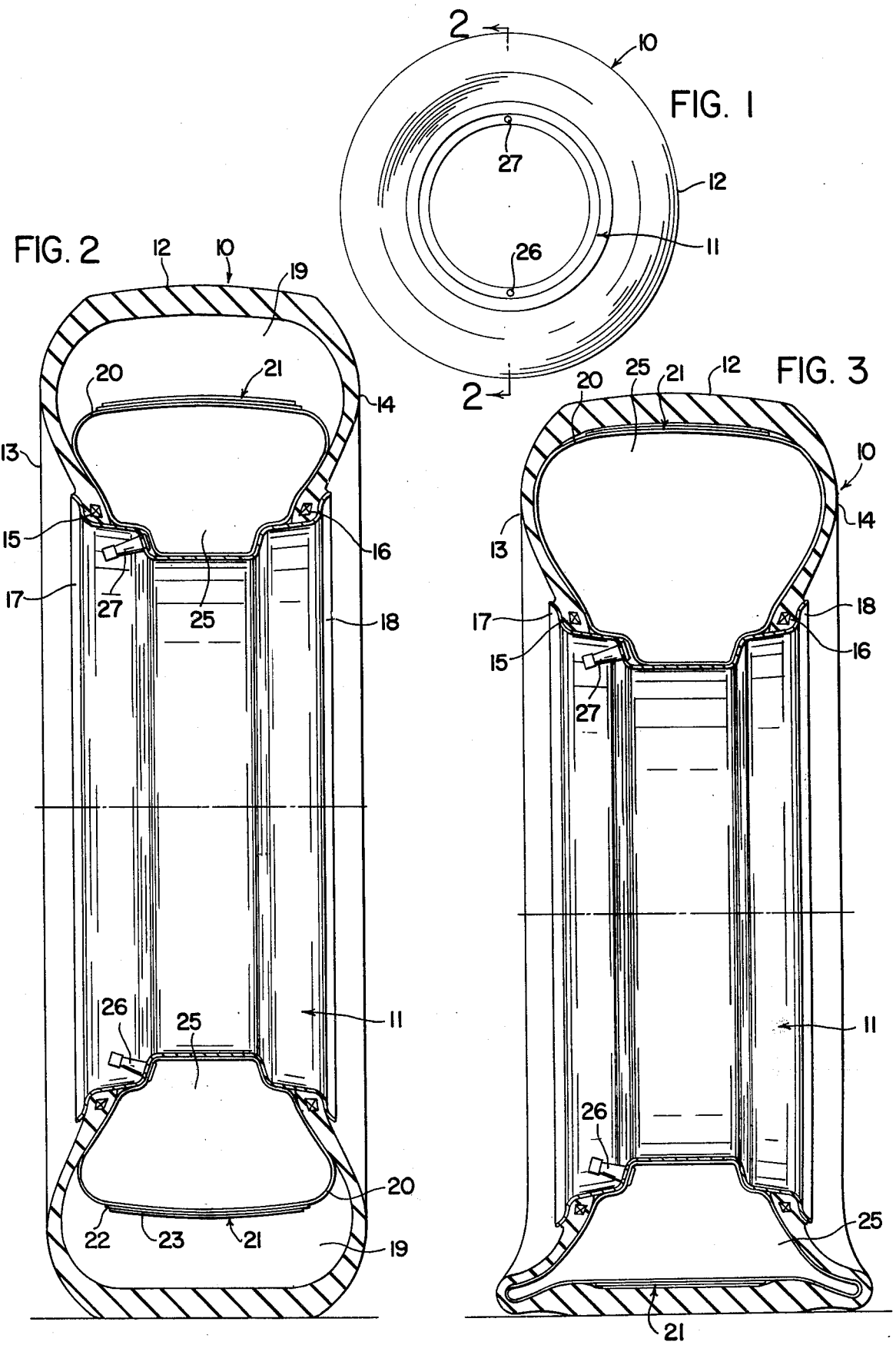

PNEUMATIC TIRE WITH PUNCTURE RESISTANCE INTERNAL SAFETY STRUCTURE

BACKGROUND OF THE INVENTION

This invention relates to pneumatic tires for vehicles and especially to a tire with a capability for running after unexpected pressure loss resulting from puncture or other tire carcass failure. More particularly, the invention relates to an internal safety structure such as an inflatable tube or resilient toroidal member with special reinforcing means.

Pneumatic tires occasionally become underinflated or completely deflated due to puncture or the like and when this occurs, the deflated or flat tire must be replaced with a spare. In some cases a blowout or other sudden pressure loss can cause the vehicle to go out of control.

Many problems are encountered when operating a vehicle with a deflated or underinflated tire. A deflated or underinflated tire is unstable and makes steering difficult. Often the tire beads unseat and eventually come off the wheel rim. Also, driving a vehicle with a deflated tire causes considerable discomfort to the driver and passengers since there is essentially no cushion between the wheel rim and the road surface. An additional problem is that friction develops between the upper and lower portions of the deflated sidewall of the tire causing the sidewalls to generate heat that results in degradation and/or excessive wear of the two portions.

A tire that can be run after loss of or reduction in pressure has been a desirable objective in the tire industry for some time. A tire that can be run in a deflated condition for an appreciable distance permits the driver to continue after the loss of or reduction in pressure or until a replacement tire can be obtained or the damaged tire repaired. This would eliminate changing tires on the road and the need to depend on the serviceable condition of a spare tire that takes up considerable space in the vehicle. Also, such a safety tire would permit the driver to continue on some distance until a safe stopping place could be found thus avoiding sudden stopping on crowded, streets, bridges and highways. Many pneumatic tire constructions have been designed in an attempt to achieve these capabilities such as the constructions of U.S. Pat. Nos. 3,095,917, 3,392,772 and 3,724,521, however, none have been wholly successful in meeting the operational demands of current automotive vehicles.

The tire construction of the present invention, however, reduces the difficulties indicated above and affords other features and advantages heretofore not obtainable.

SUMMARY OF THE INVENTION

It is among the objects of the present invention to provide a pneumatic tire with improved means for operating in an underinflated or deflated condition in the event of loss of inflation pressure.

Still another object of the invention is to provide internal reinforcement for a special safety structure within a pneumatic tire that bears between the wheel rim and the tire tread in order to permit operation of the vehicle in a deflated or underinflated condition.

A further object of the invention is to provide an internal reinforcement for an automobile tire safety structure that permits the safety structure to radially expand in the event of a pressure loss to avoid direct contact between the wheel rim and the tire carcass.

These and other objects are accomplished by the unique pneumatic tire construction of the invention, the utility of which is realized when the tire is mounted on a vehicle wheel rim and becomes partially or wholly deflated during operation of the vehicle. The tire has a toroidal internal safety structure that engages the wheel rim within the tire pressure chamber to provide auxiliary support and cushioning effect in the event of a reduction or loss of pressure within the pressure chamber. The safety structure includes a toroidal body and an outer circumferential belt comprising one or more superposed plys of cord reinforced elastomeric material wrapped around the safety structure. A narrow central circumferential portion of the belt is attached to the safety structure in a relatively narrow circumferential zone so that the belt is radially expandible without interference with the major portion of the underlying surface of the safety structure in response to an inflation pressure loss or reduction in pressure in the tire. Accordingly, in the event of tire deflation the safety structure expands to maintain a partial inflation of the tire and the circumferential belt resists puncture of the safety structure so that the wheel rim and tire may continue to carry the vehicle even though it is only partially inflated.

BRIEF DESCRIPTION OF THE DRAWINGS

FIG. 1 is a side elevation of a vehicle wheel rim and pneumatic tire constructed in accordance with the invention.

FIG. 2 is a sectional view on an enlarged scale taken on the line 2—2 of FIG. 1 and illustrating the pneumatic tire in its normal inflated condition;

FIG. 3 is a sectional view similar to FIG. 2 showing the tire in its partially deflated condition after a pressure loss occurs;

DESCRIPTION OF THE PREFERRED EMBODIMENT

Figure 4:
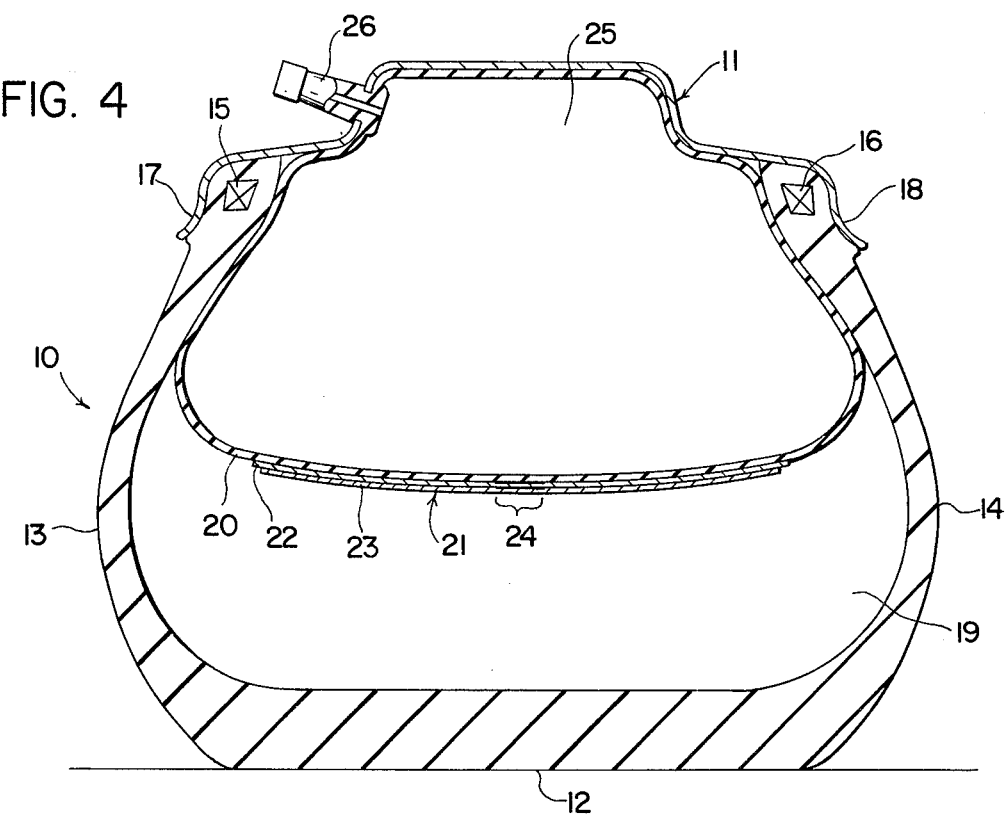
FIG. 4 is a sectional view on a still larger scale illustrating the wheel rim and the pneumatic tire in the inflated condition as illustrated in FIG. 2.

Referring more particularly to the drawings and initially to FIGS. 1 to 3 there is shown a pneumatic tire 10 embodying the invention mounted on a conventional vehicle wheel rim 11. The tire has as conventional components, a circumferential tread portion 12, sidewalls 13 and 14 and beads 15 and 16 seated against radial flanges 17 and 18 in the wheel rim 11. The tire defines with the wheel rim 11 a toroidal pressure chamber 19.

In accordance with the invention, an inflatable safety tube 20 is positioned within the chamber 19 and against and around the respective portions of the wheel rim 11. The tube 20 is formed, for example, of elastomeric material which may or not be cord reinforced and which is adapted to be inflated within the pressure chamber 19.

Figure 6:
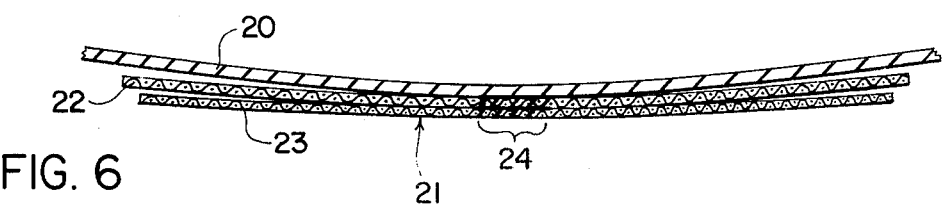
FIG. 6 is a fragmentary sectional view on a still larger scale illustrating the safety tube and circumferential reinforcing belt for the pneumatic tire of FIGS. 1 to 5.

Located around the outer circumference of the safety tube 20 is a reinforcing belt 21 comprising two superposed plys 22 and 23 of cord reinforced elastomeric material. The cords may be, for example, formed of textile material or may be steel and in the embodiment shown, have a width slightly greater than the spacing between the beads 15 and 16. The plys 22 and 23 are adhered to one another and to the safety tube 20 (FIG. 6) in a relatively narrow central circumferential zone 24 approximately 12.7 millimeters wide. Accordingly, the wide marginal portions on either side of the zone 24 are relatively loose and movable relative to the outer surface of the safety tube 20. This means for adhering the plys 22 and 23 of the belt 21 and the belt itself to the safety tube 20 permits desired radial expansion of the safety tube 20 within the pressure chamber 19.

The tube 20 defines a pressure chamber 25 which is inflated independently of the chamber 19 using a pressure that, in the absence of pressure in the chamber 19, will permit the safety tube to expand radially and completely fill the chamber 19. The chamber 25 is pressurized through a valve 26 extending through the wall of the wheel rim and also through the wall of the safety tube 20. The chamber 19 is pressurized through another valve 27 which extends only through the wheel rim but not through the safety tube 20.

In operation, the safety tube 20 is first inflated through the valve 26 to a pressure (e.g., 55 kpa) sufficient to expand the safety tube into and fill the space 19. After this inflation is accomplished, the chamber 19 is pressurized through the valve 27 to provide a desired tire inflation pressure e.g., about 165 kpa. This causes the safety tube 20 to be forced in size back to approximately the condition illustrated in FIGS. 2 and 4. In this condition, the safety tube 20 does not bear against the sidewall or tread portions of the tire to any substantial extent and any abrasion or wear during normal operation is minimized.

Figure 5:
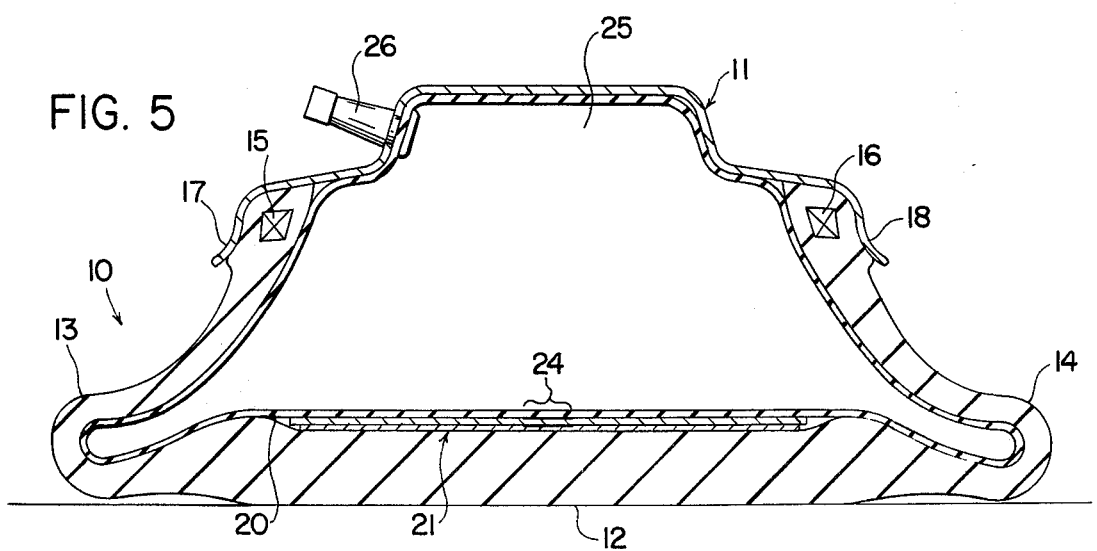
FIG. 5 is a sectional view drawn to the same scale as FIG. 4 and illustrating the pneumatic tire in the deflated condition corresponding to that shown in FIG. 3.

In the event of a loss of pressure in the chamber 19, as illustrated in FIGS. 3 and 5, the safety tube will correspondingly expand radially into the condition shown and the tire will be operated at an effective inflated pressure of about 55 kpa. The belt 21 protects the safety tube against puncture from whatever instrumentality may have punctured the tread portion 12.

Figure 7:
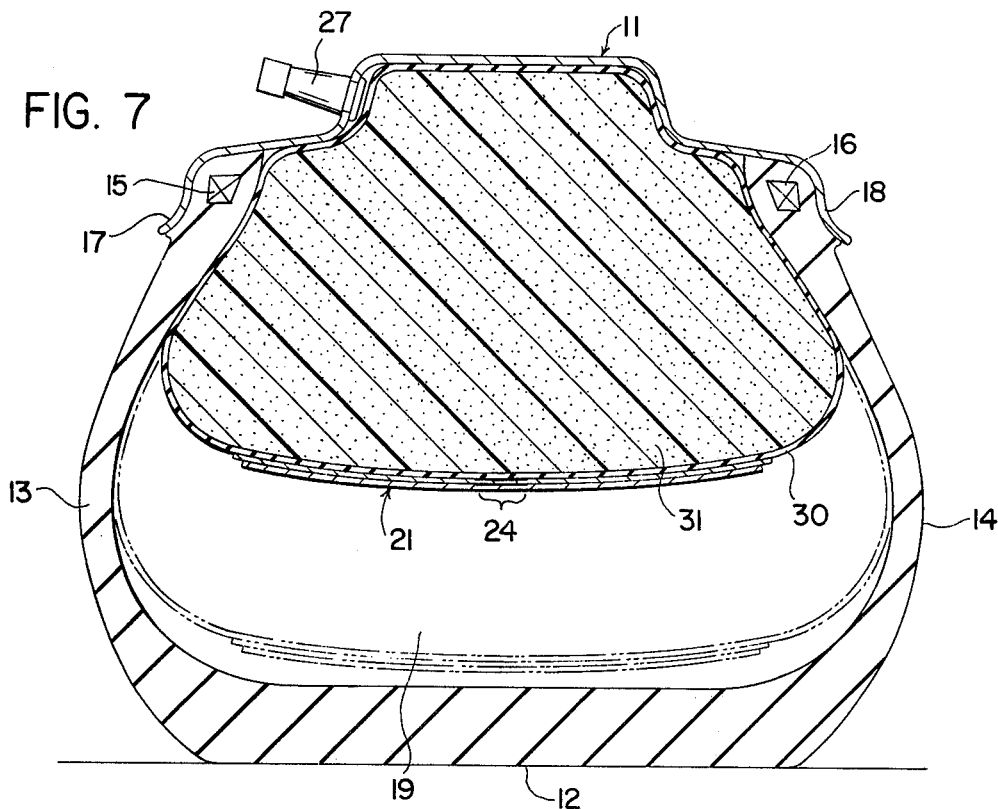
FIG. 7 is a sectional view on an enlarged scale illustrating a modified form of the invention wherein the pneumatic tire of the modified form is in its inflated condition.
Figure 8:
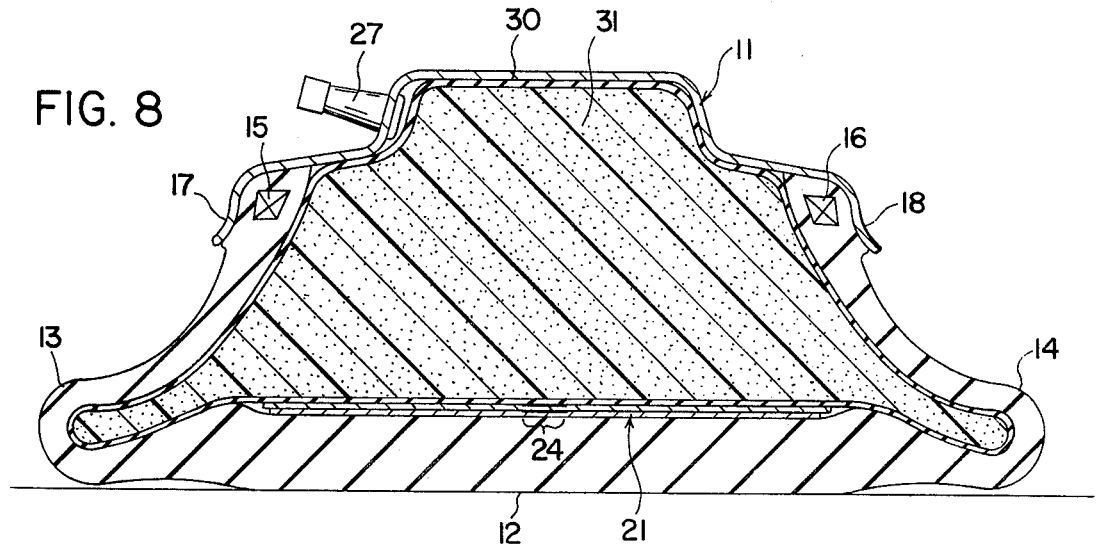
FIG. 8 is a sectional view illustrating the modified form of pneumatic tire of FIG. 7 with the tire shown in its deflated condition.

FIGS. 7 and 8 illustrate a modified form of the invention wherein like numerals are used to indicate like parts of the wheel rim and tire wherever the parts correspond to those illustrated in FIGS. 1 to 6. In this embodiment, the safety structure comprises a toroidal member 30 located within the chamber 19 in a manner similar to that of the inflatable tube 20, but in this instance the structure comprises a closed cell compressable cellular foam 31. The foam is covered with an elastomeric membrane and has a very strong heavy construction adapted to bear vehicle loads. In this instance, the member 30 in its normal uncompressed condition is formed to substantially fill the pressure chamber 19 when the chamber is depressurized. This approximate size is illustrated in dashed lines in FIG. 7. When normal inflation pressure is applied to the pressure chamber 19, however, the safety member 30 is forced substantially in size to about the condition illustrated in solid lines in FIG. 7.

When a loss of pressure occurs in the pressure chamber 19, the foam expands outward to its normal condition filling the chamber 19 and providing emergency support to permit operation of the tire on the rim as illustrated in FIG. 8.

While the invention has been shown and described with respect to preferred embodiments thereof this is intended for the purpose of illustration rather than limitation and other variations and modifications of the specific embodiments herein shown and described will be apparent to those skilled in the art all within the intended spirit and scope of the invention. Accordingly, the patent is not to be limited in scope and effect to the specific embodiments herein and shown and described nor in any other way that is inconsistent with the extent to which the progress in the art has been advanced by the invention.

I claim:

1. A pneumatic tire adapted for mounting on a vehicle wheel rim to define therewithin an annular pressure chamber, comprising:
a toroidal expandable internal safety structure located within said pressure chamber and adapted when said pressure chamber is pressurized to normal tire inflation pressure, to be compressed to a toroidal form of reduced radius and volume within said pressure chamber, and a circumferential radially expandable reinforcing belt having one or more plies, surrounding said safety structure and secured thereto in a relatively narrow central circumferential zone to avoid restraint of said safety structure when said safety structure expands, the plies of the belt also joined to each other in a relatively narrow circumferential zone to avoid restraint of the safety structure when said safety structure expands whereby in the event of deflation of said pressure chamber, said safety structure and reinforcing belt expands to accommodate operation of said vehicle with said tire in a partially supported condition.

2. A pneumatic tire as defined in claim 1 wherein said safety structure comprises an inflatable tube and valve means mounted in said wheel rim for inflating said tube.

3. A pneumatic tire as defined in claim 1 wherein said safety structure comprises a body of resilient flexible cellular foam.

* * * * *